United States Patent Office 3,334,065
Patented Aug. 1, 1967

3,334,065
ORGANOPOLYSILOXANE BEAD FORMING PROCESS AND PRODUCTS
Harlan L. Lewis and Robert E. Martin, Toledo, Ohio, assignors to Owens-Illinois, Inc., a corporation of Ohio
No Drawing. Filed May 6, 1963, Ser. No. 278,491
12 Claims. (Cl. 260—46.5)

The present invention relates to a process for forming organopolysiloxane beads. In particular, this invention relates to a method for preparing relatively uniform, small, substantially spherical beads from an alkenyltrialkoxysilane and/or a dialkenyldialkoxysilane by means which provide alkylene cross-linkages.

Silanols are compounds which contain one or more hydroxyl groups attached to a silicon atom. If attention is limited to molecules which possess only one silicon atom, four broad types of silanols may be distinguished: (1) silanols, of the formula $T_3SiOH$; (2) silanediols, of the formula $T_2Si(OH)_2$; silanetriols, of the formula $TSi(OH)_3$; and (4) silicic acid, $Si(OH)_4$, which may be regarded as an anomalous member of the series. In these formulas T can represent hydrogen atoms or hydrocarbon radicals. These compounds are in general readily converted to the corresponding ether analogs, siloxanes, by a process which may be envisioned as the loss of one molecule of water per two such hydroxyl groups. When more than one silanol grouping is present per molecule, the product is commonly a mixture of polymeric siloxanes, and detailed structural characterization of the product is usually impracticable. The tendency toward siloxane formation is so great that silanols are usually prepared in situ from a hydrolyzable precursor; corresponding to the classes cited above, these precursors can be compounds of the formulas $T_3SiY$, $T_2SiY_2$, $TSiY_3$, and $SiY_4$, where T has the meanings hereinbefore assigned, and Y represents a group convertible by hydrolysis to a hydroxyl group, such as alkoxy, acyloxy, or halogen.

Much research has been expended on organopolysiloxanes, and compositions are known which are useful as lubricants, laminating media, protective films, and similar products. Also, silica beads have found application as catalysts or catalyst supports in fixed, moving or fluidized bed systems for hydrocarbon conversion processes in the petroleum industry. Consequently, methods have been provided for preparing beads by condensation of silanols. The process usually involves suspension of the selected silanol in an inert medium, or as an aqueous emulsion, in the presence of acid or base. The silanol is thus confined to a spherical shape until the extensive formation of interior siloxane crosslinkages has hardened the droplets to beads. Thus far beads from silanols have not been reported which contain crosslinkages other than siloxane groups.

It is an object of the present invention to provide a method for preparing relatively uniform, small organopolysiloxane beads.

It is another object to provide a method for preparing organopolysiloxane beads which contain alkylene cross-linkages.

It is a further object to provide a method for forming alkylene crosslinkages in organopolysiloxane beads by vinyl polymerization.

According to the present invention, a mixture which comprises water and at least one compound of the formula

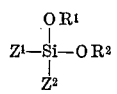

wherein $Z^1$ represents an alkenyl radical which contains from two to five carbon atoms, $Z^2$ represents a radical selected from the group which consists of $Z^1$ and $R^3O$—, and each of $R^1$, $R^2$, and $R^3$ independently represents an alkyl radical which contains from one to four carbon atoms, is heated; the resultant mixture is concentrated, and its admixture with a water-immiscible organic compound and a free-radical initiator is heated with agitation to give relatively uniform, small organopolysiloxane beads which contain alkylene crosslinkages.

Representative organopolysiloxane precursors of the formula

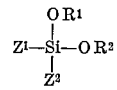

as described above are vinyltriethoxysilane, diallyldimethoxysilane, 1-(1 - methyl - 2 - propenyl)diethoxy(1-propyloxy)silane, 1-(3-butenyl)tri(1-butyloxy)silane, and di-1-(2-methyl - 3 - butenyl)-diethoxysilane. Representative water-immiscible compounds useful in the process of the present invention are hydrocarbons which are liquids at least below 200° C., and which do not boil below the maximum temperature of the particular reaction mixture in which they are used; examples are the saturated cyclic and acyclic alkanes which contain from six to twenty carbon atoms, inclusive, as well as aromatic hydrocarbons which contain from six to twelve carbon atoms. Suitable free radical initiators for use in the practice of the present invention include sodium persulfate, 2,2′-azo-bis-isobutyronitrile, benzene-diazoacetate, acetyl peroxide, cyclohexanone peroxide, p-t-butylcumene hydroperoxide, cumene hydroperoxide, p-menthane hydroperoxide, benzoyl peroxide, p-chlorobenzoyl peroxide, di-t-butyl peroxide, 2,2-bis(t-butylperoxy)butane, t-butyl peracetate, t-butyl perbenzoate, and di-t-butyl diperphthalate.

The alkenyltrialkoxysilanes used in practicing the present invention can be represented by the formula

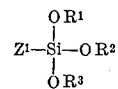

and the dialkenyldialkoxysilanes by the formula

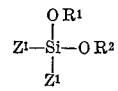

wherein $Z^1$, $R^1$, $R^2$, and $R^3$ have the meanings already assigned.

The initial reaction is believed to involve hydrolysis and subsequent linear condensation

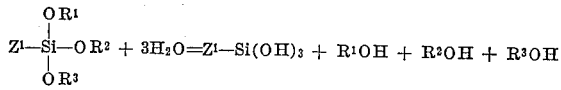

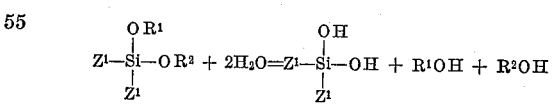

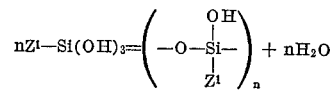

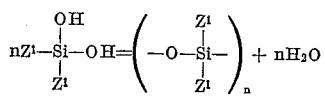

The alkanol side products, $R^1OH$, $R^2OH$, and $R^3OH$, can be removed by volatilization. When more than one alkenyltrialkoxysilane or dialkenyldialkoxysilane is present, polymeric chains which contain each corresponding siloxane residue probably result. The stoichiometry of these equations indicates that the minimum water necessary for complete hydrolysis, assuming subsequent complete condensation to siloxanes, is $(2S_2+3S_3)/2$, where $S_2$ and $S_3$ represent, respectively, the total moles of dialkenyldialkoxysilane and alkenyltrialkoxysilane used. Subjection of the linear organopolysiloxane to conditions which cause vinyl polymerization gives a complex polymer crosslinked with alkylene bridges. Initiation can be envisioned in simplified form for a vinylsiloxane polymer as

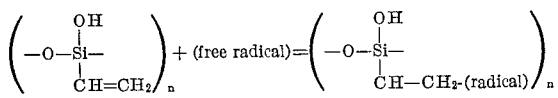

Propagation then proceeds by intermolecular or intramolecular attack of the product radical on available olefinic linkages attached to other silicon atoms. It will be apparent that the product from an alkenyltrialkoxysilane (e.g., a vinyltrialkoxysilane) can undergo further siloxane crosslinking by virtue of its residual silanol groups. This probably occurs to a limited extent during the initial hydrolysis and linear condensation steps, and is essentially completed during the radical polymerization stage, when elevated temperatures are commonly employed. The products from a dialkenyldialkoxysilane (e.g., a divinyldialkoxysilane) are not, of course, capable of crosslinking by siloxane formation; bead formation for the latter compounds is therefore entirely dependent on the production of alkylene bridges between the otherwise linear organopolysiloxane molecules.

In the procedure of this invention usually a mixture which comprises water and at least one silane of the formula

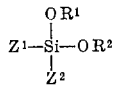

wherein $Z^1$, $Z^2$, $R^1$, and $R^2$ have the meanings already assigned, in a relative molar ratio of water:silane of at least $(2S_2+3S_3)/2$, wherein $S_2$ and $S_3$ represent, respectively, the total moles of dialkenyldialkoxysilane and alkenyltrialkoxysilane used, is heated between ambient temperature and reflux temperature for a time of from 1 to 10 hours; 50 to 90 mole percent of the alkanol side product is removed by volatilization; the reaction mixture is heated at temperatures within the range of up to 100 centigrade degrees above the boiling point of pure water at the prevailing pressure for a time up to 30 minutes; and the admixture of the resultant resinous product with an organic peroxide catalyst of at least 10 volume percent, based on the total volume of the mixture, of a water-immiscible hydrocarbon is stirred at temperatures up to 200° C.; more particularly from 80° C. to 180° C. for a time of from 30 minutes to 48 hours, more particularly from 1 to 3 hours to give relatively uniform, small organopolysiloxane beads which contain alkylene crosslinkages.

In a preferred embodiment of this invention usually a mixture which comprises water and at least one silane of the formula

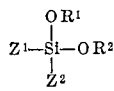

wherein $Z^1$, $Z^2$, $R^1$, and $R^2$ have the meanings already assigned, in a relative molar ratio of water:silane of from $(2S_2+3S_3)/2:1$ to $100(2S_2+3S_3)/2:1$, wherein $S_2$ and $S_3$ represent, respectively, the total moles of dialkenyldialkoxysilane and alkenyltrialkoxysilane used, is heated under reflux for two to four hours; 70 to 80 mole percent of the alkanol side product is removed by distillation; the reaction mixture is heated at temperatures in the range of 110° C. to 180° C. for a time of up to ten minutes at a pressure of about one atmosphere; and the admixture of the resultant resinous product with a peroxide free-radical initiator in a molar ratio of initiator:silane (of the formula shown above) of from 0.001:1 to 10:1, and from 10 to 90 volume percent, based on the total volume of the mixture, of a water-immiscible, liquid hydrocarbon, is stirred at temperatures in the range of 80° C. to 180° C. for a time of from one to three hours to give relatively uniform, small organopolysiloxane beads which contain alkylene crosslinkages.

The initial reaction mixture of the cited procedure can optionally contain an acidic or basic catalyst, although the hydrolysis and subsequent condensations normally proceed at a convenient rate without them. To avoid premature gelation of the resins the quantity of acid or base in the reaction mixture must be below 0.01 mole of acid or base per mole of hydrolyzable silanol precursor. Similarly a solvent, e.g., ethanol, can be added to render the reaction mixture homogeneous.

A further variation in the procedure can be achieved by hydrolyzing individually two or more silanes of the formula

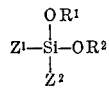

as already defined, and then combining the resultant organopolysiloxanes to form the initial reaction mixture described above. The resultant resinous mixture ultimately yields, by the method described, relatively uniform, small organopolysiloxane beads which contain alkylene crosslinkages. It is believed that the product formed in this way is a block copolymer of the constituent organopolysiloxanes, but practical verification of this is not possible.

During the initial hydrolysis, it is probable that condensation of the resultant silanols occurs by equilibrium reactions of the type already cited. During the concentration step, the increasing proximity of the remaining silanol functions probably leads to further linear polymerization, and to crosslinking if interior silanol groups are present; if concentration is carried beyond the cited limits, gelation can occur.

The resinous product of the concentration step is heated to a temperature above the boiling point of pure water at the prevailing pressure for a specified time, usually with stirring. The time and temperature are determined by the particular composition used, but a temperature of 110° to 200° C. at ambient pressure and times up to 30 minutes are usual. The elimination of water and other volatile materials from the reaction mixture at this point presumably leads to further linear polymerization and, if interior silanol groups are present, to crosslinking; the mixture becomes increasingly viscous. At any time prior to this step the mixtures can be stored in a sealed container before proceeding further.

The organopolysiloxane beads provided by this invention can be used as refractory fillers in plastics, including polyethylene and alkyd resins; as desiccants and adsorbents; and as pigments or pigment carriers in oil or water based paints.

The following examples further illustrate the invention:

Example 1

A 2-liter, three-necked flask was equipped with a thermometer, magnetic stirrer, and condenser; the condenser carried a take-off to allow reflux or distillation. In the flask thus prepared were placed 420 ml. (2 moles) of vinyltriethoxysilane, 108 ml. (6 moles) of water, and 450 ml. of 95% ethanol. The resultant two-phase mixture was heated to about 80° C.; after about five minutes a one-phase system was formed. The mixture thus obtained was then heated under reflux for four hours. At the end of this time, 490 ml. of 95% ethanol was removed by distillation. This quantity represents all of the added ethanol plus 80% of the theoretical ethanol produced by hydrolysis of vinyltriethoxysilane. The resultant concentrate was then used in the procedures as shown below.

Example 2

(A) The concentrate prepared by the procedure of Example 1 was heated with stirring momentarily to 110° C., and then allowed to cool to 80° C. 50 grams of the resin thus obtained and 30 drops of t-butyl perbenzoate were added with stirring to 500 grams of paraffin oil at 80° C. The resultant mixture was heated with stirring to 130° C.; during this time the initially opaque reaction mixture slowly turned clear, and then clouded with the formation of oily droplets at 130° C. Heating and stirring were continued until the temperature reached 150° C., and this temperature was maintained for one hour. At the end of this time the resultant mixture was allowed to cool to room temperature, and an equal volume of benzene was added. The diluted mixture was subjected to filtration to give about 25 grams of clear, glassy beads, about 1 micron to 2 mm. in diameter. Analysis showed the surface area of these beads to be about 400 square centimeters per gram.

(B) Sustitution of 2 moles of allyltrimethoxysilane for the vinyltriethoxysilane of Examples 1 and 2A gives, by the procedure therein described, relatively uniform, small organopolysiloxane beads which contain alkylene crosslinkages.

(C) Substitution of 1 mole of crotyltriethoxysilane and 1 mole of diallyldibutoxysilane for the vinyltriethoxysilane of Examples 1 and 2A gives, by the procedure therein described, relatively uniform, small organopolysiloxane beads which contain alkylene crosslinkages.

Example 3

(A) Fifteen grams of the concentrate prepared by the procedure of Example 1 was heated momentarily to 110° C. with stirring to give 10 grams of a more viscous material. The resin thus obtained was added to a stirred, 50-gram sample of paraffin oil at 40° C., followed by addition of 20 drops of t-butyl perbenzoate. The initially clear system thus obtained was heated with stirring to 110° C., where an exotherm of about 40° C. occurred; the mixture then became cloudy. Heating and stirring were continued for one hour, the resultant mixture was allowed to cool to room temperature, and then diluted with an equal volume of benzene. Filtration of the diluted mixture gave several grams of relatively uniform, small organopolysiloxane beads which contained alkylene crosslinkages.

(B) Substitution of 2 moles of 1-(3-butenyl)triethoxysilane for the vinyltriethoxysilane and 20 drops of 2,2'-azo-bis-isobutyronitrile for the t-butyl perbenzoate of Examples 1 and 3A gives, by the procedure therein described, relatively uniform, small organopolysiloxane beads which contain alkylene crosslinkages.

(C) Substitution of 2 moles of dimethallyldimethoxysilane for the vinyltriethoxysilane, 20 drops of di-t-butyl peroxide for the t-butyl perbenzoate, and 50 grams of decahydronaphthalene for the paraffin oil of Examples 1 and 3A gives, by the procedure therein described, relatively uniform, small organopolysiloxane beads which contain alkylene crosslinkages.

Example 4

(A) The concentrate prepared by the procedure of Example 1 was heated with stirring for 10 minutes at 120° C., and then allowed to cool to 110° C. The resin thus obtained was added to a stirred mixture of 100 grams of paraffin oil and 30 drops of t-butyl perbenzoate, also at 110° C., and the resultant mixture was heated with stirring to 150° C., and held at that temperature for two hours. The reaction mixture thus obtained was allowed to cool to room temperature, and an equal quantity of benzene was added. Filtration gave several grams of clear, relatively uniform, small organopolysiloxane beads which contained alkylene crosslinkages.

(B) Substitution of 2 moles of vinylallyldi(n-propoxy) silane for the vinyltriethoxysilane, 30 drops of di-t-butyl diperphthalate for the t-butyl perbenzoate, and 100 grams of tetrahydronaphthalene for the paraffin oil of Examples 1 and 4A gives, by the procedure therein described, relatively uniform, small organopolysiloxane beads which contain alkylene crosslinkages.

Example 5

(A) The concentrate prepared by the procedure of Example 1 was heated with stirring for about five minutes at 125° C., and then allowed to cool to about 80° C. 10 grams of the resin thus obtained was added to a stirred mixture of 100 grams of paraffin oil and 20 drops of t-butyl perbenzoate, and the resultant mixture was heated slowly. An exotherm occurred, whereupon the temperature rose quickly to about 160° C.; the reaction mixture was then held at this temperature for one hour. The resultant mixture was allowed to cool to room temperature, and then diluted with an equal volume of benzene. The mixture was then subjected to filtration to give several grams of relatively uniform, clear organopolysiloxane beads.

(B) Substitution of 1 mole of diallyldiethoxysilane and 1 mole of vinyltriethoxysilane for the vinyltriethoxysilane of Examples 1 and 5A gives, by the procedure therein described, relatively uniform, small organopolysiloxane beads which contain alkylene crosslinkages.

Example 6

(A) The concentrate prepared by the procedure of Example 1 was heated with stirring for about five minutes at 120° C., and then allowed to cool to 80° C. To 15 grams of the resin thus obtained was added 15 drops of t-butyl perbenzoate, and the resultant mixture was added slowly with stirring to 100 grams of paraffin oil at 110° C. The reaction mixture was then heated with stirring to 180° C., and held at that temperature for one hour. The opaque system thus obtained was allowed to cool to room temperature, diluted with an equal volume of benzene, and subjected to filtration, to give several grams of relatively uniform, small organopolysiloxane beads which contain alkylene crosslinkages.

(B) Substitution of 2 moles of di-1-(3-butenyl)di-(n-butoxy) silane for the vinyltriethoxysilane of Examples 1 and 6A gives, by the procedure therein described, relatively uniform, small organopolysiloxane beads which contain alkylene crosslinkages.

Those skilled in the art will note that modifications of this invention can be made in the light of the foregoing disclosure without departing from the spirit and scope of the disclosure or from the scope of the claims.

We claim:

1. In a method of forming substantially spherical beads of an organopolysiloxane having alkylene crosslinkages from a liquid, highly condensed, siloxane partial condensation product which is prepared by
(I) heating a mixture of
  (A) a silane monomer represented by the general formula

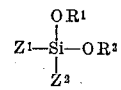

in which $Z^1$ is an alkenyl radical of 2 to 5 carbon atoms, $Z^2$ is a radical selected from the group consisting of $Z^1$ and $R^3O$—, and each of $R^1$, $R^2$ and $R^3$ independently represent an alkyl radical of 1 to 4 carbon atoms and
  (B) at least about 1.5 moles of water per mole of silane monomer, the mixture containing less than about 0.01 mole of acid per mole of silane monomer,
the heating of the mixture to form a liquid siloxane partial condensation product being contained from about 1 to 10 hours at a temperature between ambient temperature and reflux temperature;

(II) concentrating the liquid siloxane partial condensation product from step I by heating to remove by volatilization of about 50 to 90 mole percent of the alkanol by-product formed in the reaction of step I; and (III) heating the concentrate of step II at a temperature of about 110° to 200° C. to remove the remainder of the volatile material and to obtain a more highly condensed, liquid, siloxane partial condensation product; the improvement which consists essentially in converting the liquid, highly condensed, siloxane partial condensation product from step III into substantially spherical beads of an organopolysiloxane resin having alkylene cross-linkages by (A') forming an admixture, with stirring, of the aforesaid liquid siloxane partial condensation product with (a) a free-radical initiator and (b) a water-immiscible hydrocarbon which is a liquid at least below 200° C. and does not boil below the particular maximum, i.e., up to 200° C., bead-formation temperature employed, said compound of (b) constituting at least 10 volume percent of the said admixture;

(B') continuing to stir the said admixture at a temperature up to 200° C. for a period of time sufficient to convert the initially-formed oily droplets of the siloxane partial condensation product into isolatable, substantially spherical beads of an organopolysiloxane having alkylene cross-linkages; and (C') isolating the said beads.

2. A method as defined in claim 1 in which the silane monomer is an alkenyl trialkoxysilane in which the alkenyl radical contains from 2 to 5 carbon atoms and the alkoxy radical contains 1 to 4 carbon atoms.

3. A method as defined in claim 1 which the silane monomer is a dialkenyl dialkoxysilane in which the alkenyl radical contains from 2 to 5 carbon atoms and the alkoxy radical contains 1 to 4 carbon atoms.

4. A method as defined in claim 2 in which the silane monomer is divinyl dialkoxysilane.

5. A method as defined in claim 2 in which the silane monomer is allyl triethoxysilane.

6. The substantially spherical beads of an organopolysiloxane having alkylene cross-linkages that result from the improvement defined in claim 2 in the method therein set forth.

7. In a method of forming substantially spherical beads of an organopolysiloxane having alkylene cross-linkages from a liquid, highly condensed, siloxane partial condensation product which is prepared by (I) heating a mixture of
(A) an alkenyl trialkoxysilane in which the alkenyl radical contains from 2 to 5 carbon atoms and the alkoxy radical contains from 1 to 4 carbon atoms and
(B) at least about 1.5 moles of water per mole of silane monomer, the mixture containing less than about .01 mole of acid per mole of silane monomer, the heating of the mixture being from about 1 to 10 hours at a temperature between ambient temperature and reflux temperature;

(II) concentrating the liquid siloxane partial condensation product from step I by heating the product to remove by volatilization about 70 to 80 mole percent of the alkanol by-product formed; and (III) heating the concentrate of step II at a temperature of from about 110° to 180° C. for a time of up to about 10 minutes to remove more volatile material and to obtain, without gelation, a more highly condensed, liquid, siloxane partial condensation product; the improvement which consists essentially in converting the liquid, highly condensed, siloxane partial condensation product from step III into substantially spherical beads of an organopolysiloxane resin having alkylene cross-linkages by (A') forming an admixture, with stirring, of the aforesaid liquid siloxane partial condensation product with (a) a peroxide free-radical initiator in a molar ratio of initiator:silane of from about 0.001:1 to 10:1 and (b) a water-immiscible hydrocarbon which is a liquid at least below 200° C. and does not boil below the particular maximum, i.e., up to 200° C., bead-formation temperature employed, said hydrocarbon being selected from the group consisting of aromatic hydrocarbons containing from 6 to 12 carbon atoms and alkanes containing from 6 to 20 carbon atoms, and said hydrocarbon constituting from 10 to 90 volume percent of the said admixture;

(B') continuing to stir the said admixture at a temperature within the range of from about 80° C. to 180° C. for a period of time sufficient to convert the initially-formed oily droplets of the siloxane partial condensation product into isolatable, substantially spherical beads of an organopolysiloxane having alkylene cross-linkages, said time period ranging from 30 minutes to 48 hours; and (C') isolating the said beads.

8. A method as defined in claim 7 in which the relative molar ratio of water:silane is from about 1.5:1 to 100:1 and the initiator is t-butyl perbenzoate.

9. A method as defined in claim 7 in which the silane monomer is vinyl trialkoxysilane, the initiator is t-butyl perbenzoate, and the water-immiscible liquid hydrocarbon is paraffin oil.

10. A method as defined in claim 7 in which the silane monomer is vinyl triethoxysilane.

11. In a method of forming substantially spherical beads of an organopolysiloxane having alkylene cross-linkages from a liquid, highly condensed, siloxane partial condensation product which is prepared by (I) heating a mixture of
(A) a silane monomer represented by the general formula $$Z'-\underset{\underset{Z^2}{|}}{\overset{\overset{OR'}{|}}{Si}}-OR^2$$

in which Z' is an alkenyl radical of 2 to 5 carbon atoms, $Z^2$ is a radical selected from the group consisting of $Z^1$ and $R^3O-$, and each of $R^1$, $R^2$ and $R^3$ independently represent an alkyl radical of 1 to 4 carbon atoms and
(B) about 3 moles of water per mole of silane monomer, the mixture containing less than about 0.01 mole of acid per mole of silane monomer, the heating of the mixture to form a liquid siloxane partial condensation product being continued from about 1 to 10 hours at a temperature of about 80° C.;

(II) concentrating the liquid siloxane partial condensation product from step I by heating to remove by volatilization about 80 mole percent of the alkanol by-product formed in the reaction of step I; and (III) heating the concentrate of step II at a temperature of about 110° C. to remove the remainder of the volatile material and to obtain, without gelation, a more highly condensed, liquid, siloxane partial condensation product; the improvement which consists essentially in converting the liquid, highly condensed, siloxane partial condensation product from step III into substantially spherical beads of an organopolysiloxane resin having alkylene cross-linkages by (A') forming an admixture, with stirring, of the aforesaid liquid siloxane partial condensation product with (a) an organic peroxide free-radical initiator and (b) a water-immiscible hydrocarbon which is a liquid at least below 200° C. and does not boil below the particular maximum, i.e., up to 200° C., bead-formation temperature employed, said hydrocarbon being an alkane containing from 6 to 20 carbon atoms and constituting from 10 to 90 volume percent of the said admixture;

(B') continuing to stir the said admixture at a temperature within the range of from about 80° C. to 180° C. for a period of time sufficient to convert the initially-formed oily droplets of the siloxane partial condensation product into isolatable, substantially spherical beads of an organopolysiloxane having alkylene cross-linkages, said time period ranging from 1 to 3 hours; and (C') isolating the said beads from admixture with the aforesaid alkane by filtration after diluting the said admixture with a hydrocarbon diluent.

12. A method as defined in claim 11 in which the silane is vinyl triethoxysilane.

References Cited

UNITED STATES PATENTS

| | | | |
|---|---|---|---|
| 2,450,594 | 10/1948 | Hyde | 260—46.5 |
| 2,486,162 | 10/1949 | Hyde | 260—46.5 |
| 2,714,099 | 7/1955 | Weyenberg | 260—46.5 |
| 2,777,869 | 1/1957 | Bailey et al. | 260—46.5 |
| 3,013,915 | 12/1961 | Morgan | 260—46.5 |
| 3,183,205 | 5/1965 | Bailey et al. | 260—46.5 |
| 3,258,444 | 6/1966 | Santelli | 260—448.24 |

FOREIGN PATENTS 517,150 10/1955 Canada.

DONALD E. CZAJA, *Primary Examiner.*

LEON J. BERCOVITZ, *Examiner.*

M. I. MARQUIS, *Assistant Examiner.*